Patented Feb. 15, 1938

2,108,485

UNITED STATES PATENT OFFICE 2,108,485

OXACYANINES AND PROCESS OF PREPARING THEM

Frances M. Hamer, London, England, assignor, by mesne assignments, to Eastman Kodak Company, Jersey City, N. J., a corporation of New Jersey No Drawing. Application April 25, 1934, Serial No. 722,255. In Great Britain May 2, 1933

15 Claims.  (Cl. 260—44)

This invention relates to new compounds and particularly to a new class of photographic sensitizing dyes, termed oxacyanines, and methods for the preparation thereof. These dyes are useful for sensitizing gelatino-silver-halide emulsions, particularly silver chloride emulsions, in the blue and violet regions of the spectrum.

Cyanine dyes of various kinds have been known for many years but no one has ever prepared oxacyanines, i. e., dyes in which two oxazole nuclei are linked together by a single methenyl group.

Accordingly, it is an object of my invention to provide new cyanine dyes, more specifically oxacyanines and dibenzoxacyanines and methods for their preparation. Other objects will hereinafter appear.

In its broader aspects the reaction comprises the condensation of two arylene oxazole nuclei by means of an alkyl nitrite in the presence of an anhydride of a lower aliphatic acid. The term, arylene, is meant to embrace groups of the benzene series, such as phenylene, and groups of the naphthalene series, such as naphthylene.

As regards the starting points for these oxacyanines, 1-methylbenzoxazole is well-known, being prepared by the action of acetic anhydride on o-aminophenol (Ladenburg, Ber., 1876, 9, 1524). This method of ring-closure is a general one and can be applied also to substituted o-aminophenols. Thus from 1-amino-2-naphthol hydrochloride was prepared 2-methyl-β-naphthoxazole (I) (Böttcher, Ber., 1883, 16, 1933; Michel and Grandmougin, Ber., 1892, 25, 3429). Moreover by the action of acetic anhydride on 2-amino-1-naphthol hydrochloride, one obtains a 56% yield of pure 1-methyl-α-naphthoxazole (II), b. p. 178–201°/18–20 mm., m. p. 36–37°

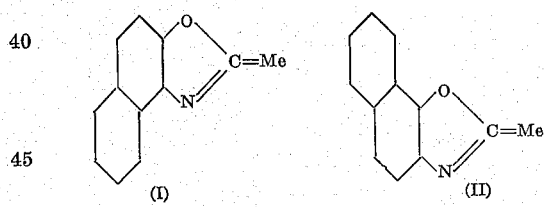

1-methylbenzoxazole (or its derivatives) is converted into a quaternary salt in the usual manner. The most convenient alkyl salts to prepare and use are the alkyl iodides, in spite of the fact that the resultant dyes are contaminated by periodides; to remove such impurities, the crude products are treated with sulphur di-oxide. Other alkyl salts such as the etho- or metho-p-toluene sulfonates may similarly be employed, although the alkyl iodides are preferable as quaternary salts because more easily formed.

More specifically, the preparation of the dye is as follows: 1-methylbenzoxazole or 1-methyl-α-naphthoxazole or 2-methyl-β-naphthoxazole in the form of the methiodide or ethiodide is condensed by means of an alkyl nitrite such as amyl nitrite or n-butyl nitrite in the presence of the anhydride of a lower aliphatic acid, such as acetic anhydride or propionic anhydride. Substituted 1-methylbenzoxazole or mu-methyl naphthoxazole salts can also be used, e. g. the methylmethoxybenzoxazole etc., described by Lindemann, Könitzer, and Romanoff (Annalen, 1927, 456, 284). The dye so prepared is then washed and recrystallized.

In the following examples, illustrating my invention, parts by weight are given.

EXAMPLE 1

2:2'-dimethyloxacyanine iodide

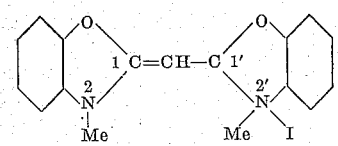

1-methylbenzoxazole methiodide (5 parts) was added to boiling acetic anhydride (40 parts). No further heat was applied, but freshly distilled amyl nitrite, b. p. 94–100° (2 parts) was added. There was violent frothing, a brown colour developed, and all the quaternary salt dissolved. The reaction mixture was cooled with ice, when the crude oxacyanine separated. It was filtered off, ground with water to remove unchanged quaternary salt, and extracted with ether. The undissolved residue was suspended in rectified spirit (13 parts) and cooled with ice during the passage of sulphur di-oxide. The suspension was then boiled and stirred, and sufficient spirit for complete solution was added (130 parts). The solid which crystallized on cooling was almost colourless, and gave an almost colourless alcoholic solution. It was obtained in 23% yield.

Example 2

1-methylbenzoxazole methiodide (5 parts) was added to boiling acetic anhydride (40 parts). n-butyl-nitrite (2 parts) was added. The original salt dissolved and separation of 2:2'-dimethyl-oxacyanine iodide took place on cooling. It was filtered off, washed with water and ether, treated, in spirit suspension, with sulphur di-oxide and finally recrystallized from spirit, being obtained in 26% yield.

Example 3

*2:2'-diethyloxacyanine iodide*

This was prepared following the method of Example 1 except that 1-methylbenzoxazole ethiodide (5 parts) was employed as the quaternary salt. The purified product was obtained in 25% yield. The methyl-alcoholic solution of the dye is colorless.

Example 4

1-methylbenzoxazole ethiodide (5 parts) was added to propionic anhydride (40 parts) at 135°, when most of the salt dissolved. On adding amyl nitrite (2 parts) a brown colour developed, the mixture frothed, all the solid dissolved, and the temperature rose to 145°. On cooling, there separated 2:2'-diethyloxacyanine iodide, and this was washed as in the other examples, treated with sulphur di-oxide, and recrystallized. The yield was 28% after recrystallization.

Example 5

*2:2'-dimethyl-5:6:5':6'-dibenzoxacyanine iodide*

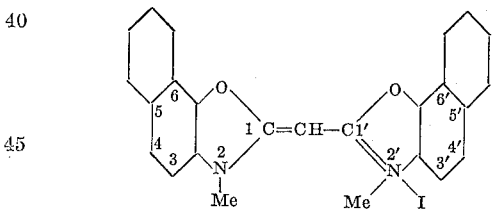

1-methyl-α-naphthoxazole methiodide (a new alkyl quaternary salt) was prepared by heating 1-methyl-α-naphthoxazole (1 part) with methyl iodide (1 part) in a sealed tube at 100° for 2 days. It was purified by washing with ether and with acetone (87% yield). To prepare the oxacyanine, the methiodide (5 parts) and then amyl nitrite (2 parts), were added to boiling acetic anhydride (40 parts). The product, after washing with water and with ether, was suspended in methyl alcohol (13 parts), and the ice-cooled suspension was treated with sulphur di-oxide, after which recrystallization from methyl alcohol (2000 parts) was carried out. The pale yellow solid gave an almost colourless alcoholic solution.

Example 6

*2:2'-diethyl-5:6:5':6'-dibenzoxacyanine iodide*

1-methyl-α-naphthoxazole ethiodide was prepared by heating the base with ethyl iodide. The washed, recrystallized ethiodide was treated with amyl nitrite and acetic anhydride. The solid product was washed as usual, treated with sulphur di-oxide, and recrystallized. The pale yellow solid gave a very pale yellow spirit solution.

Example 7

*2:2'-dimethyl-3:4:3':4'-dibenzoxacyanine iodide*

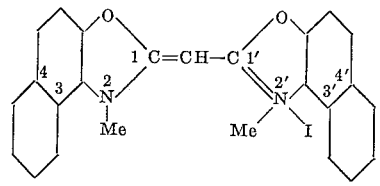

2-methyl-β-naphthoxazole methiodide was prepared by heating 2-methyl-β-naphthoxazole (1 part) and methyl iodide (1 part) in a sealed tube at 100° for 2 days. After washing the product with ether, it was obtained by recrystallization from absolute alcohol in the form of fine yellow needles. This methiodide was converted into the oxacyanine as in the other examples. The crude product was dark brown after washing with water and ether, but became a golden yellow when its cooled methyl-alcoholic suspension was treated with sulphur di-oxide. It was further purified by recrystallization from methyl alcohol. Its alcoholic solution was a very pale yellow.

Example 8

*2:2'-diethyl-3:4:3':4'-dibenzoxacyanine iodide*

When 2-methyl-β-naphthoxazole and ethyl iodide were heated for 2 days in a sealed tube at 100°, the reaction did not proceed to completion. The unchanged base was therefore recovered by ether extraction and was again heated with ethyl iodide. By further repetition of this process, the yield of crude ethiodide was worked up to 68%; it was recrystallized from absolute alcohol. The preparation of the oxacyanine was carried out by a method analogous to that of other examples. During treatment of an alcoholic suspension of the washed, crude product with sulphur di-oxide, the colour of the solid changed from brown to yellow. It was finally recrystallized from rectified spirit. Its spirit solution was almost colourless.

The temperatures referred to herein are expressed in degrees centigrade.

Thus it will be apparent that I have provided a general method for the preparation of oxacyanines and that these oxacyanines are of the class wherein two nuclei are linked together by a simple methenyl group linked through the μ-carbon atom of each nucleus, these nuclei being benzoxazole or naphthoxazole nuclei which may in turn be substituted by various suitable elements or groups.

What I claim as my invention and desire to be secured by Letters Patent of the United States is:

1. The process of preparing oxacyanines which comprises condensing two molecules of an alkyl quaternary salt selected from the group consisting of benzoxazole and naphthoxazole alkyl quaternary salts, by means of an alkyl nitrite in the presence of the anhydride of a lower aliphatic acid.

2. The process of preparing oxacyanines which comprises condensing two molecules of a benzoxazole alkyl quaternary salt by means of amyl nitrite in the presence of acetic anhydride.

3. The process of preparing oxacyanines which comprises condensing two molecules of a naphthoxazole alkyl quaternary salt by means of amyl nitrite in the presence of acetic anhydride.

4. An oxacyanine having the structure

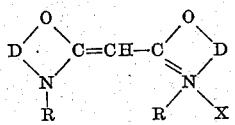

in which D is a nucleus selected from the group consisting of benzene and naphthalene nuclei, R equals alkyl and X equals halogen.

5. An oxacyanine having the structure

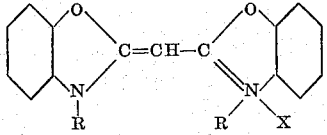

in which R equals alkyl and X equals halogen.

6. An oxacyanine having the structure

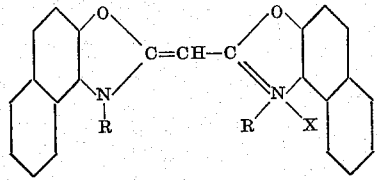

in which R equals alkyl and X equals halogen.

7. An oxacyanine having the structure

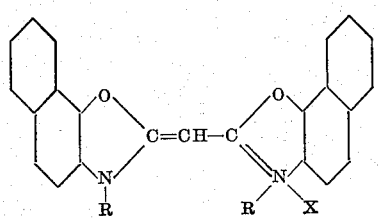

in which R equals alkyl and X equals halogen.

8. A 2,2'-dimethyloxacyanine halide.
9. A 2,2'-diethyloxyacyanine halide.
10. A 2,2'-dimethyl-3:4:3':4'-dibenzoxacyanine halide.
11. A 2,2'-dimethyl-5:6:5':6'-dibenzoxacyanine halide.
12. 2,2'-dimethyloxacyanine iodide.
13. A 2,2'-diethyloxacyanine iodide.
14. 2,2'-dimethyl-3:4:3':4'-dibenzoxacyanine iodide.
15. 2,2'-dimethyl-5:6:5':6'-dibenzoxacyanine iodide.

FRANCES M. HAMER.